(12) United States Patent
Colvig et al.

(10) Patent No.: US 7,114,006 B2
(45) Date of Patent: Sep. 26, 2006

(54) APPARATUS AND METHOD TO REMOTELY CHANGE IP ADDRESS OF SERVER

(75) Inventors: Arthur J. Colvig, Tucson, AZ (US); David V. Valverde, Tucson, AZ (US); Bryan J. Wright, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 10/337,091

(22) Filed: Jan. 6, 2003

(65) Prior Publication Data

US 2004/0133664 A1    Jul. 8, 2004

(51) Int. Cl.
*G06F 15/16* (2006.01)

(52) U.S. Cl. ...................... 709/245; 709/221
(58) Field of Classification Search ............... 709/245, 709/224, 220–222
See application file for complete search history.

(56) References Cited

U.S. PATENT DOCUMENTS

| | | | |
|---|---|---|---|
| 5,908,469 A | 6/1999 | Botz et al. | 713/201 |
| 6,035,332 A * | 3/2000 | Ingrassia et al. | 709/224 |
| 6,104,717 A | 8/2000 | Coile et al. | 370/401 |
| 6,247,062 B1 | 6/2001 | Sarkar | 709/245 |
| 6,289,378 B1 * | 9/2001 | Meyer et al. | 709/223 |
| 6,381,645 B1 * | 4/2002 | Sassin | 709/227 |
| 6,430,610 B1 * | 8/2002 | Carter | 709/221 |
| 6,871,226 B1 * | 3/2005 | Ensley et al. | 709/224 |
| 2003/0115298 A1 * | 6/2003 | Baker | 709/220 |
| 2004/0230703 A1 * | 11/2004 | Sukigara | 709/253 |

FOREIGN PATENT DOCUMENTS

| | | |
|---|---|---|
| EP | 1011244 A2 | 6/2000 |
| WO | WO/52900 | 9/2000 |

OTHER PUBLICATIONS

Natividad, "Fast, automated IP address changes", Dec. 1998, 2 pgs.

* cited by examiner

*Primary Examiner*—Abdullahi Salad
(74) *Attorney, Agent, or Firm*—Dale F. Regelman

(57) ABSTRACT

A method to change the IP address of a server from a remote operator station, where that server comprises an HTTP server having a first IP address, and where that server is capable of communicating with one or more remote operator stations. One of those remote operator stations submits to the server, using the first IP address, an IP address change request. That IP address change request includes discontinuing use of the first IP address and commencing use of a second IP address. After receipt of the IP address change request, the server generates an HTML page comprising an embedded applet, where that applet is capable of monitoring the TCP/IP connection between the remote operator station and the server. The server provides that HTML page/applet to the remote operator station. Thereafter, the remote operator station continuously displays the status of the IP address change request using the provided applet. After the IP address change request is completed, the remote operator station communicates with the server using the second IP address.

6 Claims, 8 Drawing Sheets

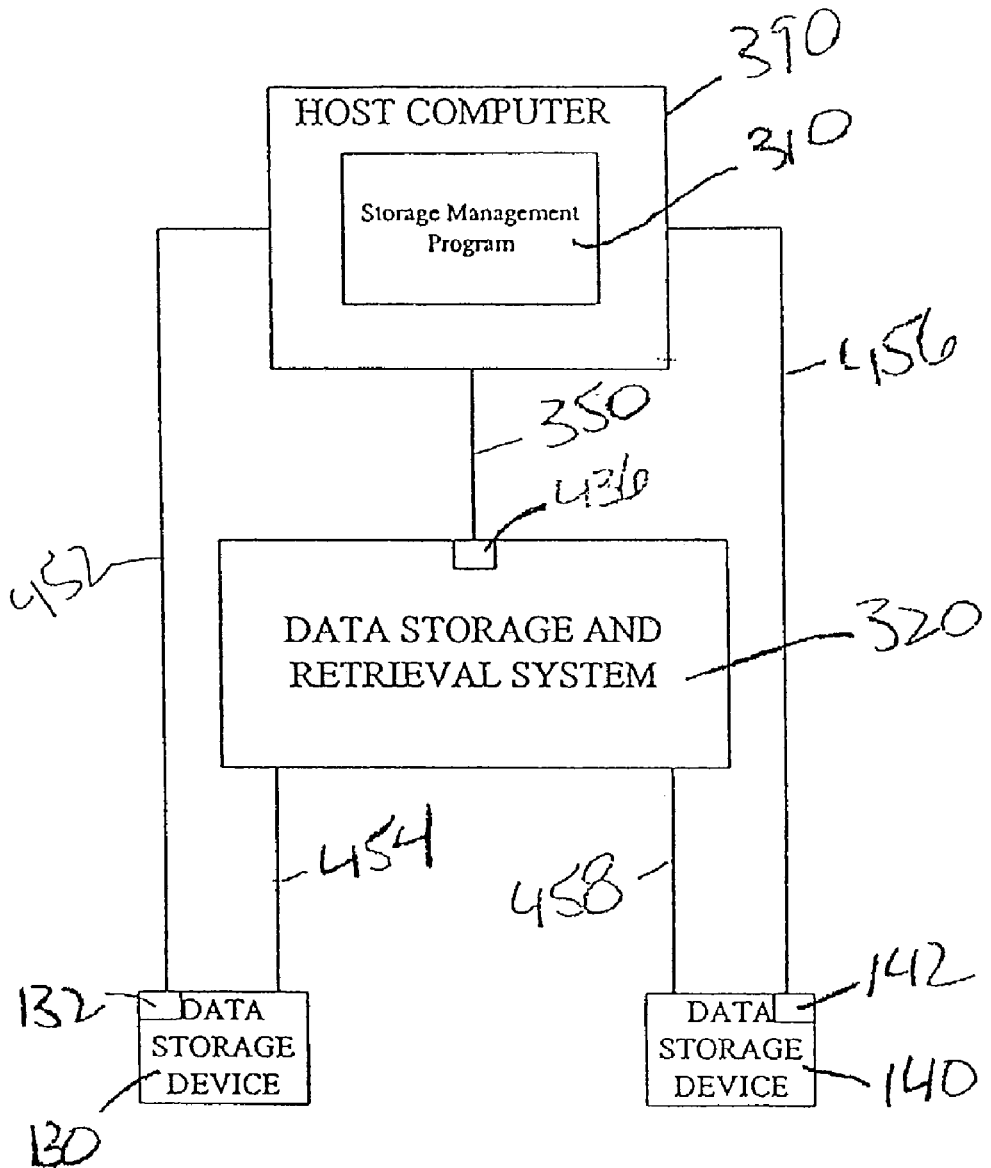
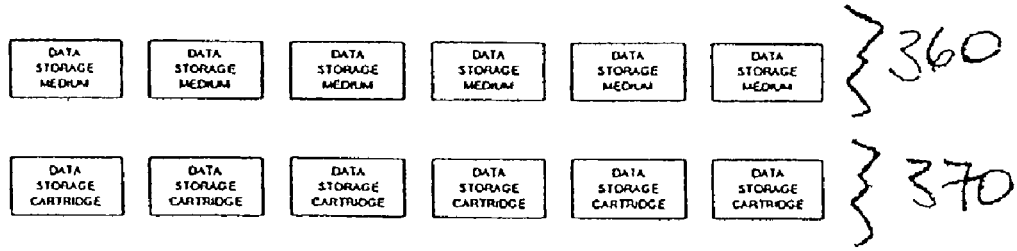
FIG.3

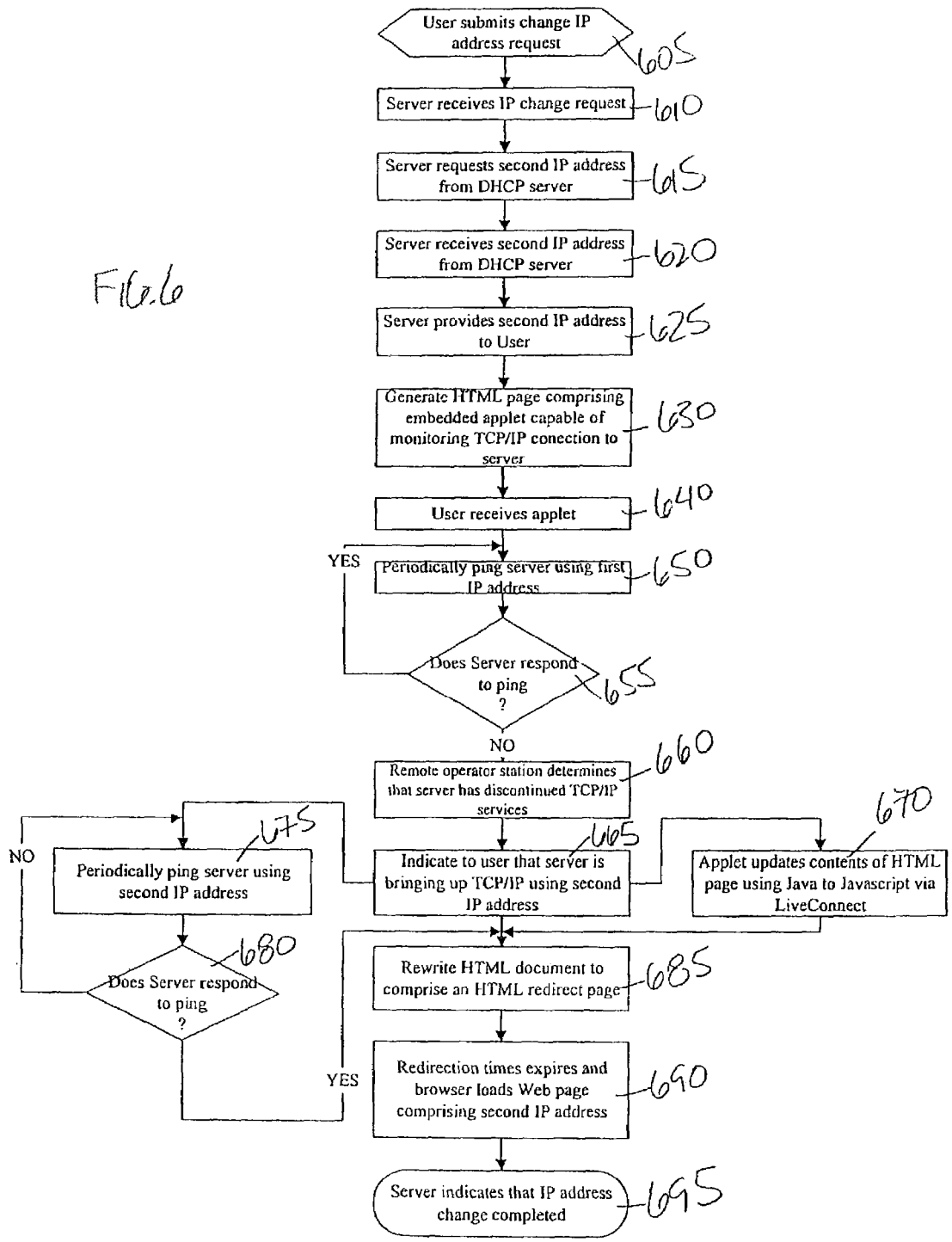

APPARATUS AND METHOD TO REMOTELY CHANGE IP ADDRESS OF SERVER

FIELD OF THE INVENTION

Applicant's invention relates to an apparatus and method to change the IP address of a server using a remote operator station. In certain embodiments, the server comprises a portion of a data storage and retrieval system.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, compactflash (compactflash is a registered trademark of Sandisk corporation), smartmedia (smartmedia is a registered trademark of Kabushiki Kaisha Toshiba DBA Toshiba Corporation), and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM TotalStorage™ 3494 Enterprise Tape Library. Some of the automated media storage libraries have dual or multiple accessors to provide a level of redundancy and to enhance performance.

Prior art data storage and retrieval systems include a single operator station which allows a user to manage the operation and status of the library. Applicants' data storage and retrieval system includes at least one local operator station. In addition, however, Applicants' data storage and retrieval system is capable of communicating with one or more remote operator stations. Applicants' invention further includes a method whereby a remote user, using a remote operator station, can change the IP address of the data storage and retrieval system.

In the most widely installed level of the Internet Protocol ("IP") today, an IP address is a 32-bit number that identifies each sender or receiver of information that is sent in packets across the Internet. When a user requests an HTML page, the Internet Protocol part of TCP/IP includes the user's IP address in the message (actually, in each of the packets if more than one is required) and sends it to the IP address that is obtained by looking up the domain name in the Uniform Resource Locator ("URL") requested. At the other end, the recipient can see the IP address of the Web page requestor and can respond by sending another message using the IP address it received.

An IP address has two parts: the identifier of a particular network on the Internet and an identifier of the particular device (which can be a server or a workstation) within that network. On the Internet itself—that is, between the router that moves packets from one point to another along the route —only the network part of the address is used. In addition to the network address or number, information is needed about which specific machine or host in a network is sending or receiving a message. So the IP address needs both the unique network number and a host number, which is unique within the network. Part of the local address can identify a subnetwork or subnet address, which makes it easier for a network that is divided into several physical subnetworks, for example, several different local area networks, to handle many devices.

Because networks vary in size, there are four different address formats or classes that have historically been used:

Class A addresses are for large networks with many devices.

Class B addresses are for medium-sized networks.

Class C addresses are for small networks (fewer than 256 devices).

Class D addresses are multicast addresses.

The first few bits of each IP address indicate which of the address class formats it is using. Such address structures comprise:

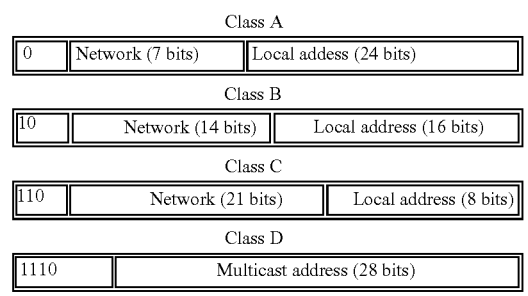

The IP address is usually expressed as four decimal numbers, each representing eight bits, separated by periods. This is sometimes known as the dot address and, more technically, as dotted quad notation. For Class A IP addresses, the numbers would represent "network.local.local.local"; for a Class C IP address, they would represent "network.network.network.local". The number version of the IP address can (and usually is) represented by a name or series of names called the domain name.

Internet Protocol Version 6, expands the size of the IP address to 128 bits, which can accommodate growth in the number of network addresses. For hosts still using IPv4, the use of subnets in the host or local part of the IP address will help reduce new applications for network numbers. In addition, many sites using IPv4 Internet have mitigated the Class C network address limitation by using the Classless Inter-Domain Routing ("CIDR") scheme for address notation.

The machine or physical address used within a local area network may differ from the Internet's IP address. The most typical example is the 48-bit Ethernet address. TCP/IP includes a facility called the Address Resolution Protocol that allows use of a table that maps IP addresses to physical addresses. The table is known as the ARP cache.

SUMMARY OF THE INVENTION

Applicants' invention comprises a method and apparatus to change the IP address of a server from a remote operator station, where that server comprises an HTTP server having a first IP address, and where that server is capable of communicating with one or more remote operator stations. Applicants' method submits to the server from one of the remote operator stations, using the first IP address, an IP address change request. That IP address change request includes discontinuing use of the first IP address and commencing use of a second IP address.

After receipt of the IP address change request, the server generates an HTML page comprising an embedded applet, where that applet is capable of monitoring the TCP/IP connection between the remote operator station and the server. The server provides that HTML page/applet to the remote operator station. Thereafter, the remote operator station continuously displays the status of the IP address change request using the provided applet. After the IP address change request is completed, the remote operator station communicates with the server using the second IP address.

BRIEF DESCRIPTION OF THE DRAWINGS

The invention will be better understood from a reading of the following detailed description taken in conjunction with the drawings in which like reference designators are used to designate like elements, and in which:

FIG. 3 is a block diagram showing the components of Applicants' data storage and retrieval system;

FIG. 6 is a flowchart summarizing the steps in a second embodiment of Applicant's method.

DETAILED DESCRIPTION OF THE PREFERRED EMBODIMENTS

Figure 1:
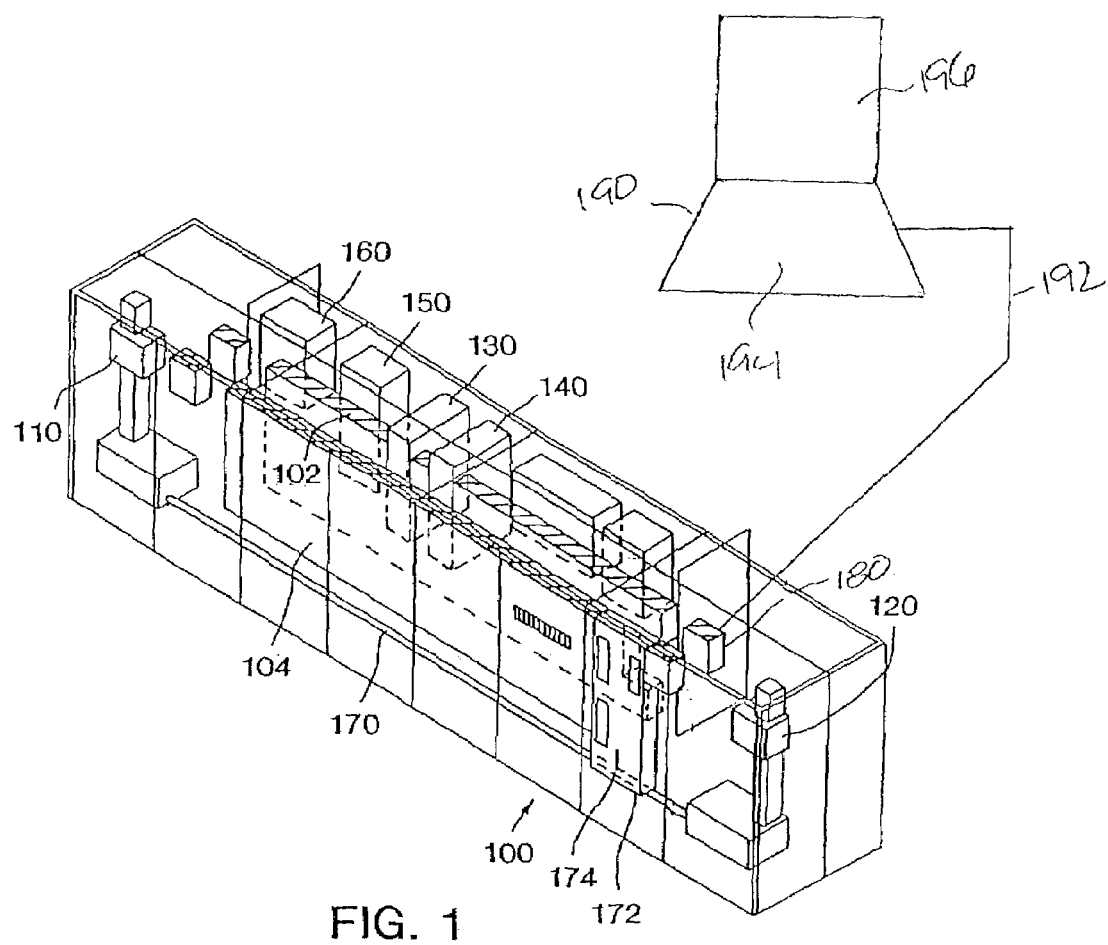
FIG. 1 is a perspective view of a first embodiment of Applicant's data storage and retrieval system.

Referring to the illustrations, like numerals correspond to like parts depicted in the figures. The invention will be described as embodied in an automated data storage and retrieval subsystem for use in a data processing environment. The following description of Applicant's method to change the IP address of a server using a remote operator station is not meant, however, to limit Applicant's invention to either data storage and retrieval systems, or to data processing applications, as the invention herein can be applied to changing IP addresses in general.

FIG. 3 illustrates the hardware and software environment in which preferred embodiments of the present invention are implemented. Host computer 390 includes, among other programs, a storage management program 310. In certain embodiments, host computer 390 comprises a single computer. In alternative embodiments, host computer 390 comprises one or more mainframe computers, one or more work stations, one or more personal computers, combinations thereof, and the like.

Information is transferred between the host computer 390 and secondary storage devices managed by a data storage and retrieval system, such as data storage and retrieval system 320, via communication links 350, 452, and 456. Communication links 350, 452, and 456, comprise a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, data storage and retrieval system 320 includes data storage devices 130 and 140. In alternative embodiments, Applicants' data storage and retrieval system 320 includes more than two data storage devices.

A plurality of portable data storage media 360 are moveably disposed within Applicants' data storage and retrieval system. In certain embodiments, the plurality of data storage media 360 are housed in a plurality of portable data storage cartridges 370. Each of such portable data storage cartridges may be removeably disposed in an appropriate data storage device.

Data storage and retrieval system 320 further includes program logic to manage data storage devices 130 and 140, and plurality of portable data storage cartridges 370. In alternative embodiments, data storage and retrieval system 320 and host computer 390 may be collocated on a single apparatus. In this case, host computer 390 may be connected to another host computer to, for example, translate one set of library commands or protocols to another set of commands/protocols, or to convert library commands from one communication interface to another, or for security, or for other reasons.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The storage management program 310 in the host computer 390 may include the functionality of storage management type programs known in the art that manage the transfer of data to a data storage and retrieval system, such as the IBM DFSMS implemented in the IBM MVS operating system.

The IBM DFSMS software is described in "DFSMS/MVS V1R4 General Information," IBM document no. GC26-4900-05, published by IBM (Copyright 1997, IBM), which publication is incorporated herein by reference in its entirety. Storage management program 310 may include known storage management program functions, such as recall and migration. The storage management program 310 may be implemented within the operating system of the host computer 390 or as a separate, installed application program. Alternatively, storage management program 310 may include device drivers, backup software, and the like.

The data storage and retrieval system 320 comprises a computer system, and manages, for example, a plurality of tape drives and tape cartridges. In such tape drive embodiments, tape drives 130 and 140 may be any suitable tape drives known in the art, e.g., one or more TotalStorage™ tape drives (TotalStorage is a trademark of IBM Corporation). Similarly, tape cartridges 370 may be any suitable tape cartridge device known in the art, such as one or more IBM TotalStorage™ tape cartridges.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed portable housings, i.e. cartridges. Examples of such data storage media include magnetic tapes, magnetic disks of various types, optical disks of various types, electronic storage media, and the like.

Applicants' automated data storage and retrieval system includes one or more accessors, such as accessors 110 and 120. An accessor is a robotic device which retrieves portable data storage media from, for example, first storage wall 102 or second storage wall 104, transports that accessed media to, for example, input/output device 130 or 140 for reading and/or writing data thereon, and returns the media, for example, to a proper storage slot. As shown in FIG. 1, accessors 110 and 120 travel bi-directionally along rail 170 in an aisle disposed between first wall of storage slots 102 and second wall of storage slots 104. U.S. Pat. No. 6,038,490, entitled "Automated Data Storage Dual Picker Interference Avoidance," teaches a method to prevent collisions occurring between accessors moveably disposed on the same rail system, and is hereby incorporated by reference herein. Import/export station 172 includes access door 174 pivotably attached to the side of system 100. Portable data storage cartridges can be placed in the system, or in the alternative, removed from the system, via station 172 and access door 174.

Library controller 160 comprises electronics and computer code to operate the various components comprising library 100. In certain of these embodiments, library controller 160 is integral with a computer. Local operator station 150 permits a local user to communicate with Applicants' automated data storage and retrieval system 100. Local operator station 150 includes an information input device 154 (not shown in FIG. 1) and an information display device 156 (not shown in FIG. 1). Communication server 180 allows one or more remote users to communicate with system 100. For example, remote operator station 190 communicates with server 180 via communication link 192. Remote operator input station 190 includes an information input device 194 and an information display device 196. In certain embodiments, server 180 comprises an HTTP server.

Communication link 192 comprises a network interface, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, Storage Area Network (SAN), Transmission Control Protocol/Internet Protocol (TCP/IP), the Internet, and combinations thereof. Although FIG. 1 shows a single remote operator station, Applicants' system 100 is capable of communicating with two or more remote operator input stations.

Figure 2A:
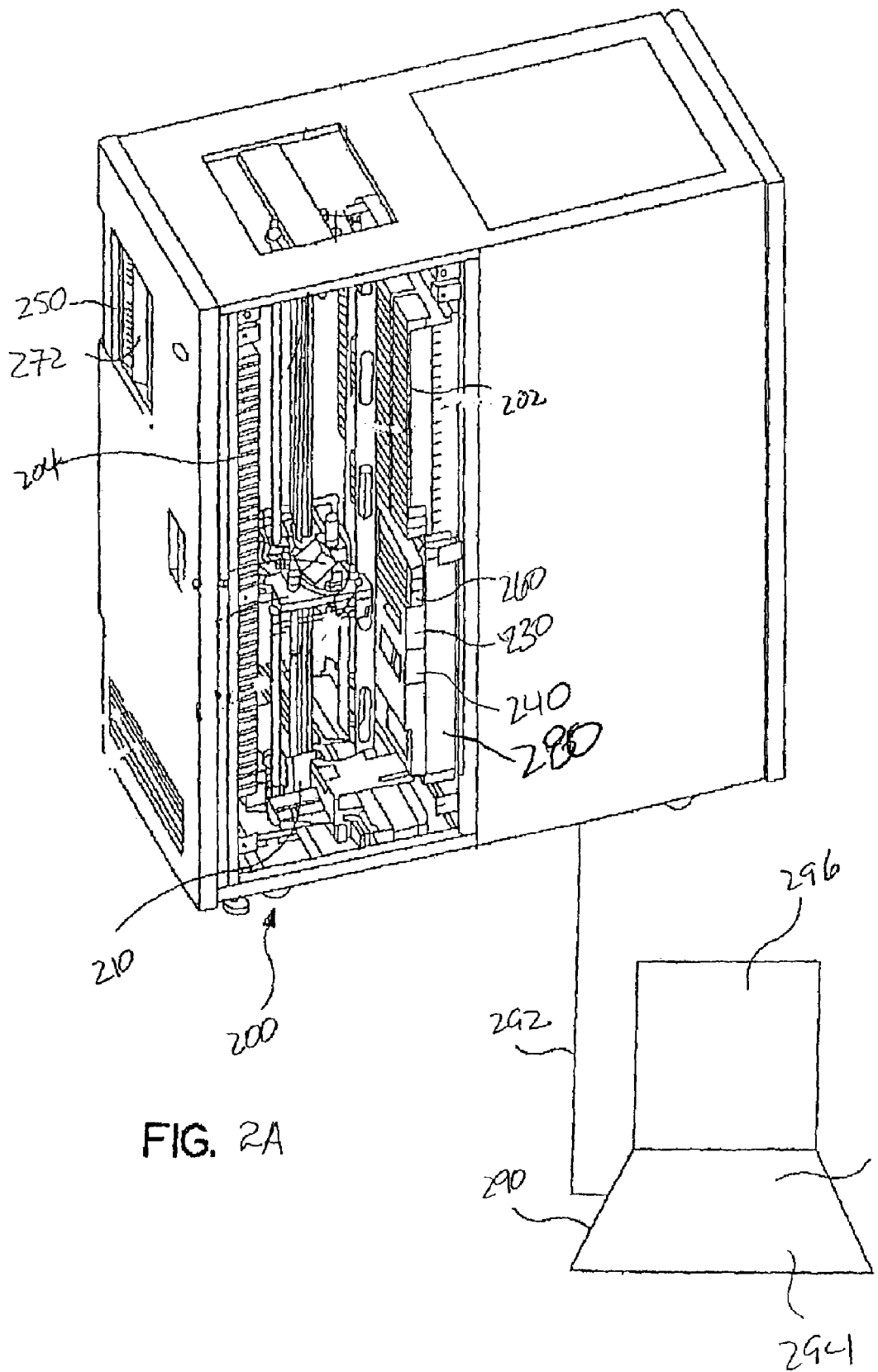
FIG. 2A is a first perspective view of a second embodiment of Applicant's data storage and retrieval system.

FIG. 2A shows system 200 which comprises another embodiment of Applicants' data storage and retrieval system. System 200 includes first storage wall 202 and second storage wall 204. Storage walls 202 and 204 each include a plurality of storage elements in which can be stored a plurality of portable data storage media. System 200 includes one or more input/output devices, such as devices 230 and 240. Input/output device 230/240 each comprise a floppy disk drive, an optical disk drive, a magnetic tape drive, and the like. System 200 further includes controller 260. System 200 further includes control panel 250 and import/export station 272.

As those skilled in the art will appreciate, one or a plurality of portable data storage cartridges can be removeably disposed in one or more slots in storage walls 202/204. Each such cartridge contains an information storage medium internally disposed therein. Such data storage media includes optical media, magnetic media, tape media, electronic media, and combinations thereof. System 200 also includes at least one robotic accessor 210 for transporting a designated portable information storage medium between a storage slot disposed in first wall 202 or second wall 204 and input/output device 230/240.

Figure 2B:
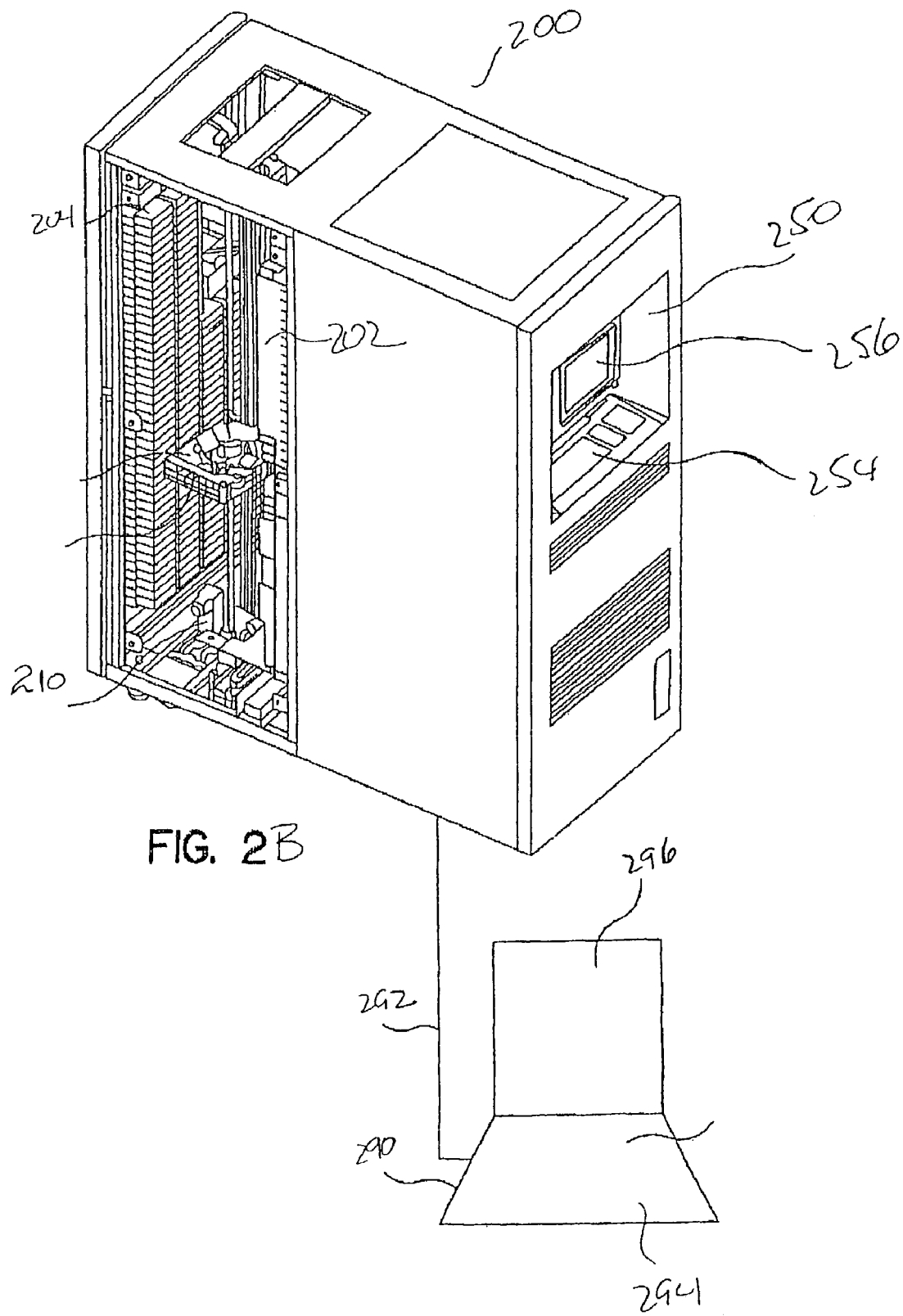
FIG. 2B is a second perspective view of the embodiment of FIG. 2A.

Data storage and retrieval system 200 further includes communication server 280 (Not shown in FIGS. 2A, 2B). In certain embodiments, server 280 comprises an HTTP server. Communication server 280 allows one or more remote users to communicate with system 200. For example, remote operator station 290 communicates with server 280 via communication link 292. Remote operator input station 290 includes an information input device 294 and an information display device 296. Data storage and retrieval system 200 is capable of communicating with one or more remote operator input stations.

Remote operator input station 290 communicates with server 280 via communication link 292. Communication link 292 comprises a network interface, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, Storage Area Network (SAN), Transmission Control Protocol/Internet Protocol (TCP/IP), the Internet, and combinations thereof. Although FIG. 2A shows a single remote operator input station, other embodiments of Applicants' system 200 includes two or more remote operator input stations. Referring now to FIG. 2B, system 200 further includes local operator station 250 (FIG. 2B). Local operator station 250 includes an information input device 254 (FIG. 2B) and an information display device 256 (FIG. 2B).

Applicants' invention includes a method to change the IP address of a server by a remote user. In certain embodiments, the server, such as server 180 (FIG. 1)/280 (FIG. 2A), is disposed in a data storage and retrieval system, such as data storage and retrieval system 100 (FIG. 1)/200 (FIGS. 2A, 2B). In the various embodiments of Applicants' method, the server uses a first IP address comprising a 32-bit number. In certain embodiments, the server uses a first IP address comprising a 128-bit number. In certain embodiments, the user requests the server discontinue use of a first IP address and commence using a second IP address, where that second IP address comprises a 32-bit number. In certain embodiments, the user requests the server discontinue use of a first IP address and commence using a second IP address, where that second IP address comprises a 128-bit number.

Figure 4:
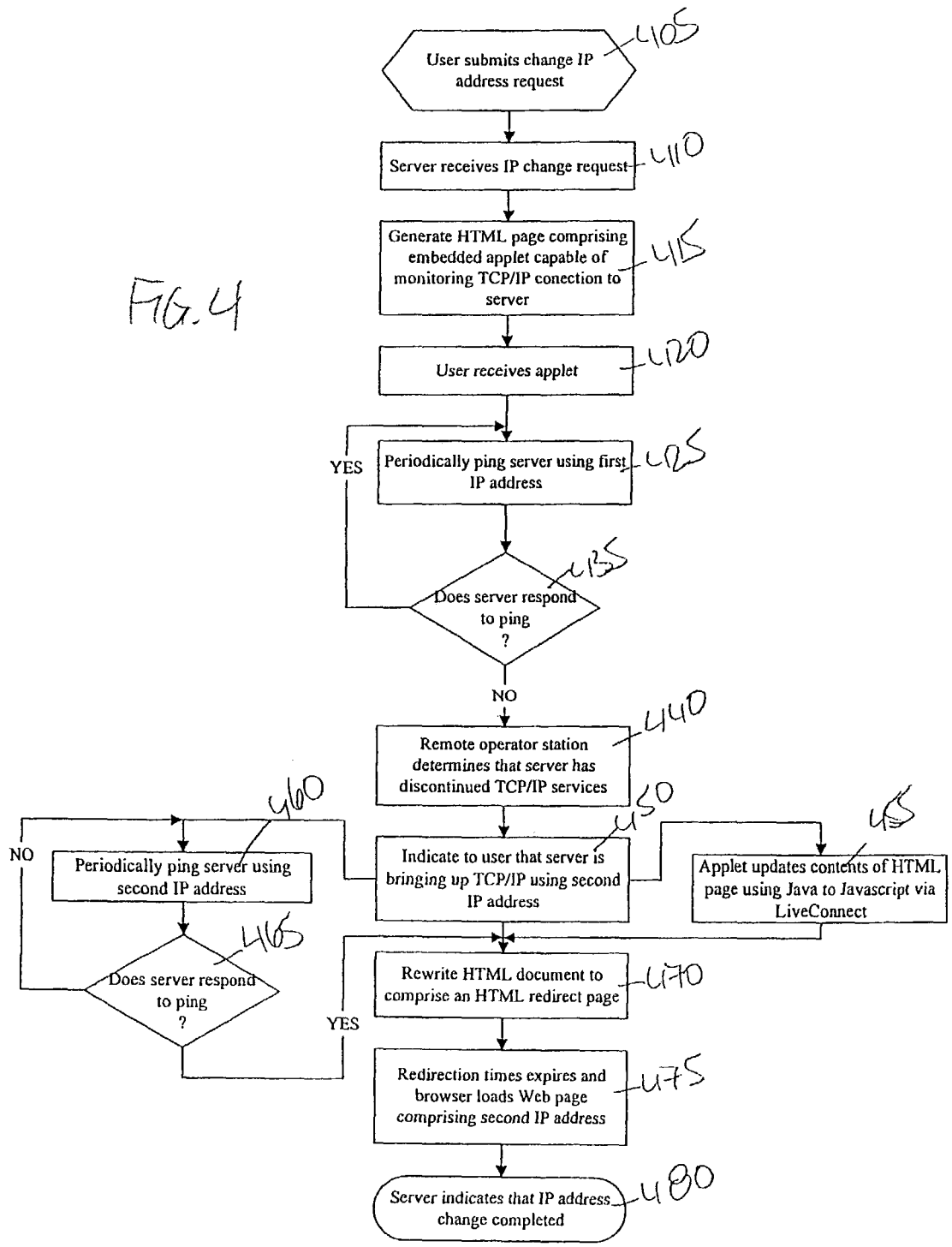
FIG. 4 is a flowchart summarizing the steps in a first embodiment of Applicants' method.

Referring now to FIG. 4, Applicants' method to change a server's IP address by a user using a remote operator station begins at step 405 wherein the remote user submits an IP address change request to the server. Applicants' method transitions from step 405 to step 410 wherein the server receives the IP address change request of step 405. Applicants' method transitions from step 410 to step 415 wherein the server generates an HTML page comprising an embedded applet capable of monitoring the server's TCP/IP connection to the remote operator station.

References herein to "an HTML page" include embodiments which includes one or more HTML pages. By "applet", Applicants mean a program written in the Java programming language that can be included in an HTML page. When using a Java technology-enabled browser to view such an HTML page that includes such an applet, the applet's code is transferred to the computer system and is executed by the browser's Java Virtual Machine.

Further in step 415, the server provides that HTML page to the remote operator station. In step 420, the remote operator station receives the HTML page/applet of step 415. Applicants' method transitions from step 420 to step 425 wherein the remote operator station, using the applet received in step 415, begins to ping the server at a first time using the first IP address. By "ping", Applicants mean using a request/response communication wherein the remote operator station provides a request to the server, and wherein the server upon receipt of that request provides a response to the remote operator station. In certain embodiments, the ping of step 425 comprises a query having the format URL.openConnection( ).getInputStream( ).

Applicants' method transitions from step 425 to step 435 wherein Applicants' method determines if the server responded to the ping of step 425 within a first time interval after the first time of step 425. In certain embodiments, the first time interval is between about 10 milliseconds and about 10 seconds in duration. In certain embodiments, the first time interval is between about 1 second and about 3 seconds in duration. In certain embodiments, the first time interval is about 2 seconds in duration. In certain embodiments, the duration of the first time interval is determined by the user. In certain embodiments, the duration of the first time interval is embodied in software downloaded to the remote operator station from the server. In certain embodiments, the duration of the first time interval is determined by the server at runtime and included in the applet formed in step 415.

If Applicants' method determines in step 435 that the server responded to the ping of step 425 within the first time interval, then Applicants' method transitions from step 435 to step 425 wherein Applicants' method again pings the server using the first IP address. Applicants' method continues to ping the server using the first IP address as long as the server responds to the preceding ping within the first time interval, i.e. Applicants' method loops between steps 425 and 435 if the server continues to respond to the pings using the first IP address. As a general matter, if the server responds to the (n)th ping using the first IP address, the remote operator station then provides an (n+1)th ping using that first IP address.

Alternatively, if Applicants' method determines in step 435 that the server did not respond to the (n)th ping of step 425 within the first time interval, then Applicants' method transitions from step 435 to step 440 wherein Applicants' method at a second time determines that the server has terminated TCP/IP services in order to change its IP address.

Applicants' method transitions from step 440 to step 450 wherein Applicants' method indicates to the user that the server is bringing up TCP/IP services using the second IP address. In certain embodiments, the remote operator station includes a visual display device. In certain of these visual display embodiments, Applicants' method in step 450 provides a visual message that the server is bringing up TCP/IP services using the second IP address. In certain embodiments, the remote operator station includes a printer. In certain of these printer embodiments, Applicants' method in step 450 provides a printed message that the server is bringing up TCP/IP services using the second IP address. In certain embodiments, the remote operator station includes a sound card. In certain of these sound card embodiments, Applicants' method in step 450 provides an auditory message that the server is bringing up TCP/IP services using the second IP address.

In certain embodiments, Applicants' method transitions from step 450 to step 455 wherein the applet provided in step 415 updates the contents of the HTML page of step 415 using Java to Javascript via LiveConnect mechanisms. In these embodiments, Applicants' method transitions from step 455 to step 470.

In certain embodiments, Applicants' method transitions from step 450 to step 460 wherein Applicants' method causes the remote operator station at a third time to provide the (n+1)th ping to the server using the second IP address. A second time interval comprises the difference between the second time of step 440 and the third time of step 460. In certain embodiments the duration of that second time interval is between about 1 second and about 30 seconds. In certain embodiments, duration of the second time interval is between 3 seconds and 5 seconds. In certain embodiments, the second time interval is about 4 seconds.

Applicants' method transitions from step 460 to step 465 wherein Applicants' method determines if the server responded to the ping of step 460 within a third time interval. In certain embodiments, the third time interval is between about 10 milliseconds and about 10 seconds in duration. In certain embodiments, the duration of the third time interval is between about 1 second and about 3 seconds. In certain embodiments, the third time interval is about 2 seconds in duration.

If Applicants' method determines in step 465 that the server did not respond to the ping of step 460 within the third time interval, then Applicants' method transitions from step 465 to step 460 wherein the remote operator station again pings the server using the second IP address.

Applicants' method continues to ping the server using the second IP address as long as the server does not respond to the preceding ping within the third time interval, i.e. Applicants' method loops between steps 460 and 465 if the server does not respond to the pings using the second IP address. As a general matter, if the server does not respond to the (n)th ping using the second IP address, the remote operator station then provides the (n+1)th ping using that second IP address.

Alternatively, if the server responds to the (n)th ping using the second IP address, then Applicants' method transitions from step 465 to step 470 wherein Applicants' method causes the remote operator station to rewrite the HTML page provided in step 415 to comprise an HTML redirect page. As those skilled in the art will appreciate, such an HTML redirect page comprises a metatag specifying a redirect time.

In certain embodiments, the redirect time is determined by the user. In certain embodiments, the redirect time is embodied in software downloaded to the remote operator station from the server. In certain embodiments, the redirect time is determined by the server at runtime and included in the applet formed in step 415. In certain embodiments which include steps 460 and 465, the redirect time is set to 0 seconds.

Applicants' method transitions from step 470 to step 475 wherein Applicants' method causes the remote operator station to load a web page for accessing the server where that web page includes the second IP address. Applicants' method transitions from step 475 to step 480 wherein the server provides a message to the remoter operator station that the IP address change is completed.

In the embodiment of Applicants' method summarized in FIG. 4, the second IP address is assigned by the remote operator station. In certain embodiments of Applicants' method, however, the second IP address is assigned dynamically from a pool of IP addresses. The Dynamic Host Configuration Protocol ("DHCP") is an Internet protocol for automating the configuration of computers that use TCP/IP. DHCP can be used to automatically assign IP addresses, to deliver TCP/IP stack configuration parameters such as the subnet mask and default router.

Figure 5A:
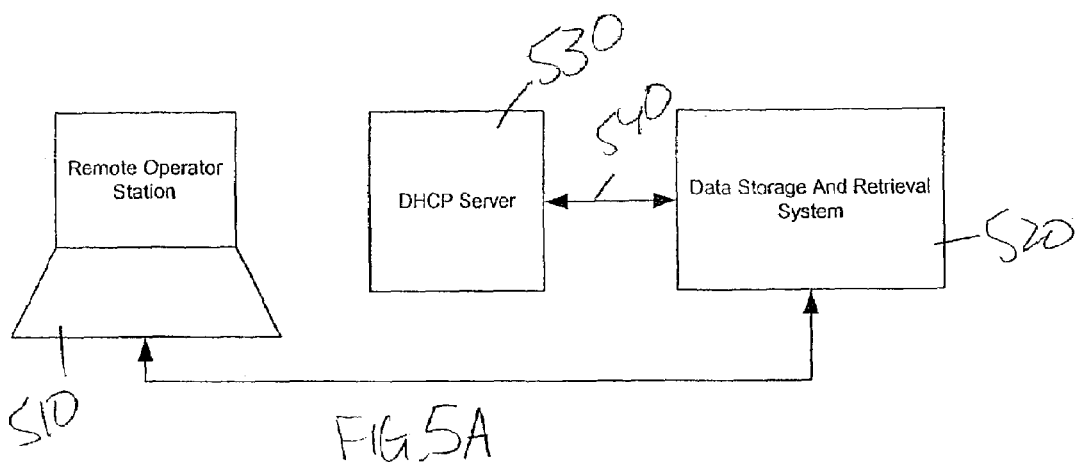
FIG. 5A is a block diagram showing an alternative embodiment of Applicants' apparatus.

Referring now to FIG. 5A, in certain embodiments remote operator station 510 is in communication with server 520 using TCP/IP protocols. In certain embodiments, server 520 comprises a portion of a data storage and retrieval system, such as data storage and retrieval system 100 (FIG. 1)/200 (FIGS. 2A, 2B). In the embodiment of FIG. 5A, server 520 is in communication with DHCP server 530 using communication link 540. In certain embodiments, server 520 communicates with DHCP server 530 using TCP/IP protocols.

Figure 5B:
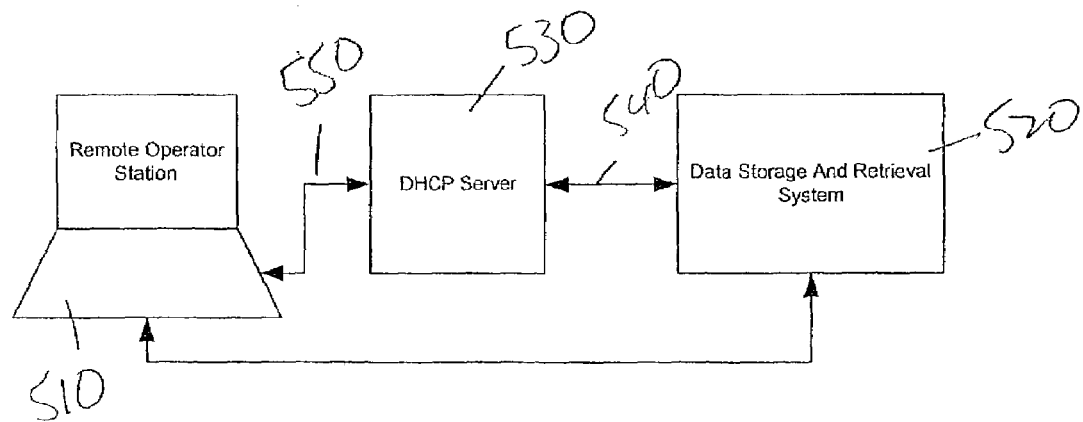
FIG. 5B is a block diagram showing another alternative embodiment of Applicants' apparatus.

Referring now to FIG. 5B, in certain embodiments remote operator station 510 is in communication with server 520 using TCP/IP protocols. In certain embodiments, server 520 comprises a portion of a data storage and retrieval system, such as data storage and retrieval system 100 (FIG. 1)/200 (FIGS. 2A, 2B). In the embodiment of FIG. 5B, server 520 is in communication with DHCP server 530 using communication link 540. Remote operator station 510 is in communication with DHCP server 530 using communication link 550.

FIG. 6 summarizes the steps of an alternative embodiment of Applicants' method to change the IP address of a server using a remote operator station, where the IP address of that server is assigned by a DHCP server. In certain embodiments, the remote operator station comprises, for example, remote operator station 190 (FIG. 1)/290 (FIGS. 2A, 2B), and the server comprises server 180 (FIG. 1)/280 disposed, respectively, in a data storage and retrieval system, such as data storage and retrieval system 100 (FIG. 1)/200 (FIGS. 2A, 2B).

Applicants' method begins at step 605 wherein the remote user submits an IP address change request to the server using the server's existing IP address, i.e. the first IP address. Applicants' method transitions from step 605 to step 610 wherein the server receives the IP address change request of step 605. Applicants' method transitions from step 610 to step 615 wherein the server requests a new IP address, i.e. a second IP address, from a DHCP server, such as DHCP server 530 (FIGS. 5A, 5B), in communication with that server. Applicants' method transitions from step 615 to step 620 wherein the DHCP server provides a second IP address to the server. Applicants' method transitions from step 620 to step 625 wherein the server provides that second IP address to the user.

Applicants' method transitions from step 625 to step 630 wherein the server generates an HTML page comprising an embedded applet capable of monitoring the server's TCP/IP connection to the remote operator station. Further in step 630, the server provides that HTML page, applet, and second IP address, to the remote operator station.

Applicants' method transitions from step 630 to step 640 wherein the remote operator station receives the HTML page/applet/second IP address, provided in step 630. Applicants' method transitions from step 640 to step 650 wherein the remote user's station begins to "ping" the server at a first time using the first IP address. In certain embodiments the "ping" of step 650 comprises a query to the server requesting that the server respond with a message that query was received. In certain embodiments, the "ping" of step 650 comprises a query having the format URL.openConnection( ).getInputStream( ).

Applicants' method transitions from step 650 to step 655 wherein Applicants' method determines if the server responded to the ping of step 650 within a first time interval after the first time of step 650. In certain embodiments, the first time interval is between about 10 milliseconds and about 10 seconds in duration. In certain embodiments, the first time interval is between about 1 second and about 3 seconds in duration. In certain embodiments, the first time interval is about 2 seconds in duration. In certain embodiments, the duration of the first time interval is determined by the user. In certain embodiments, the duration of the first time interval is established in firmware disposed in the remote operator station. In certain embodiments, the duration of the first time interval is established when the remote operator station is initially configured. In certain embodiments, the duration of the first time interval is determined by the server and is included in the applet formed in step 630.

If Applicants' method determines in step 655 that the server responded to the ping of step 650 within the first time interval, then Applicants' method transitions from step 655 to step 650 wherein Applicants' method again pings the server using the first IP address.

Applicants' method continues to ping the server using the first IP address as long as the server responds to the preceding ping within the first time interval, i.e. Applicants' method loops between steps 650 and 655 if the server continues to respond to the pings using the first IP address. As a general matter, if the server responds to the (n)th ping using the first IP address, the remote operator station then provides an (n+1)th ping using that first IP address.

Alternatively, if Applicants' method determines in step 655 that the server did not respond to the (n)th ping of step 650 within the first time interval, then Applicants' method transitions from step 655 to step 660 wherein Applicants' method at a second time determines that the server has terminated TCP/IP services in order to change its IP address.

Applicants' method transitions from step 660 to step 665 wherein Applicants' method indicates to the user that the server is bringing up TCP/IP services using the second IP address. In certain embodiments, the remote operator station includes a visual display device. In certain of these visual display embodiments, Applicants' method in step 665 provides a visual message that the server is bringing up TCP/IP services using the second IP address. In certain embodiments, the remote operator station includes a printer. In certain of these printer embodiments, Applicants' method in step 665 provides a printed message that the server is bringing up TCP/IP services using the second IP address. In certain embodiments, the remote operator station includes a sound card. In certain of these sound card embodiments, Applicants' method in step 665 provides an auditory message that the server is bringing up TCP/IP services using the second IP address.

In certain embodiments, Applicants' method transitions from step 665 to step 670 wherein the applet provided in step 630 updates the contents of the HTML page of step 630 using Java to Javascript via LiveConnect mechanisms. In these embodiments, Applicants' method transitions from step 670 to step 685.

In certain embodiments, Applicants' method transitions from step 665 to step 675 wherein Applicants' method causes the remote operator station at a third time to provide the (n+1)th ping to the server using the second IP address. A second time interval comprises the difference between the second time of step 660 and the third time of step 675. In certain embodiments the duration of that second time interval is between about 1 second and about 30 seconds. In certain embodiments, duration of the second time interval is between 3 seconds and 5 seconds. In certain embodiments, the second time interval is about 4 seconds.

Applicants' method transitions from step 675 to step 680 wherein Applicants' method determines if the server responded to the ping of step 675 within a third time interval. In certain embodiments, the third time interval is between about 10 milliseconds and about 10 seconds in duration. In certain embodiments, the duration of the third time interval is between about 1 second and about 3 seconds. In certain embodiments, the third time interval is about 2 seconds in duration.

If Applicants' method determines in step 680 that the server did not respond to the ping of step 675 within the third time interval, then Applicants' method transitions from step 680 to step 675 wherein the remote operator station again pings the server using the second IP address.

Applicants' method continues to ping the server using the second IP address as long as the server does not respond to the preceding ping within the third time interval, i.e. Applicants' method loops between steps 675 and 680 if the server does not respond to the pings using the second IP address. As a general matter, if the server does not respond to the (n)th ping using the second IP address, the remote operator station then provides the (n+1)th ping using that second IP address.

Alternatively, if the server responds to the (n)th ping using the second IP address, then Applicants' method transitions from step 680 to step 685 wherein Applicants' method causes the remote operator station to rewrite the HTML page provided in step 630 to comprise an HTML redirect page. As those skilled in the art will appreciate, such an HTML redirect page comprises a metatag specifying a redirect time. In certain embodiments which include steps 675 and 680, the redirect time is set to 0 seconds.

Applicants' method transitions from step 685 to step 690 wherein Applicants' method causes the remote operator station to load a web page for accessing the server where that web page includes the second IP address. Applicants' method transitions from step 690 to step 695 wherein the server provides a message to the remoter server location that the IP address change is completed.

Figure 7:
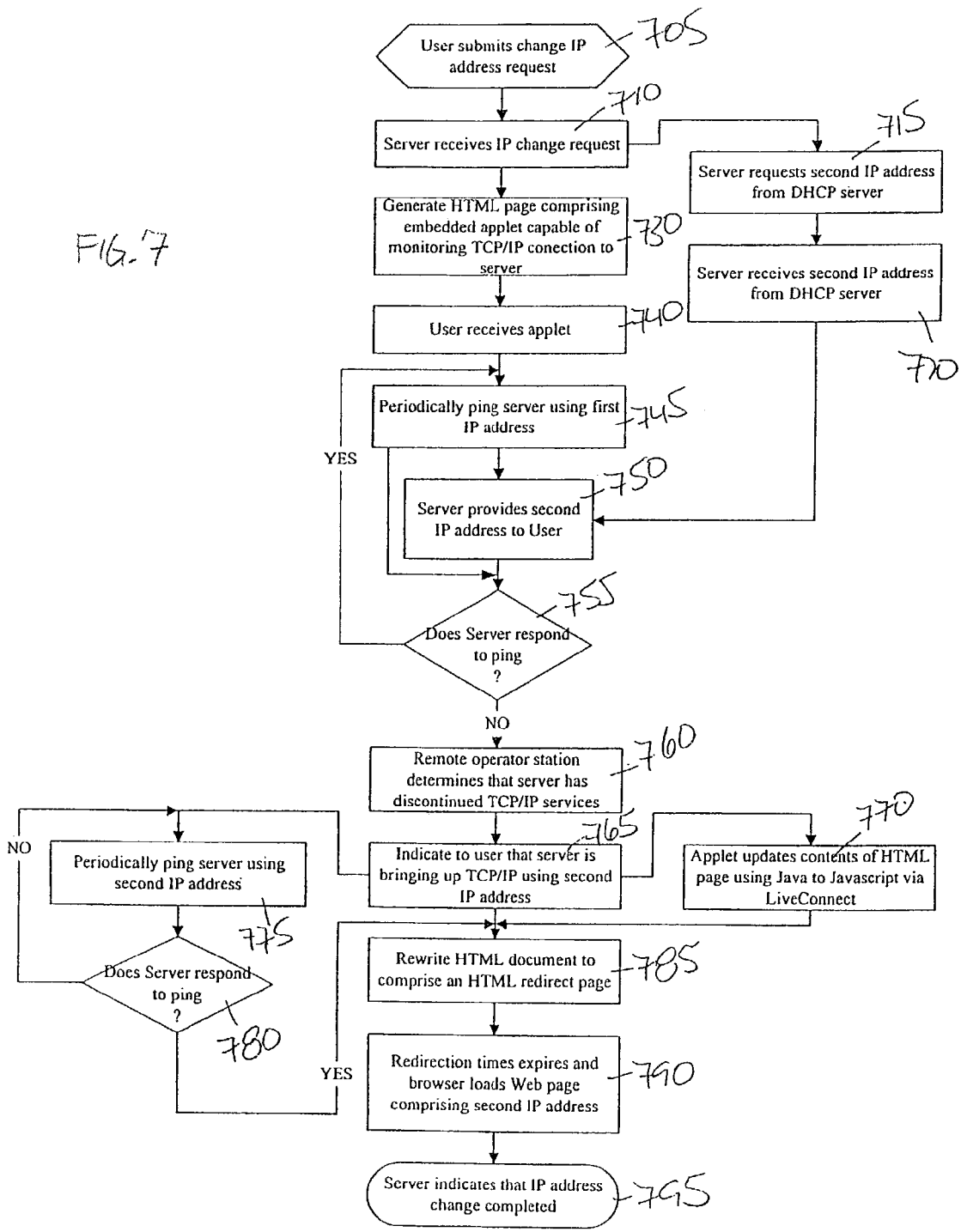
FIG. 7 is a flowchart summarizing the steps in a third embodiment of Applicants' method.

FIG. 7 summarizes the steps of an alternative embodiment of Applicants' method to change the IP address of a server using a remote operator station, where the IP address of that server is assigned by a DHCP server. In certain embodiments, the remote operator station comprises, for example, remote operator station 190 (FIG. 1)/290 (FIGS. 2A, 2B), and wherein the server is disposed in a data storage and retrieval system, such as data storage and retrieval system 100 (FIG. 1)/200 (FIGS. 2A, 2B).

Applicants' method beings at step 705 wherein the remote user submits an IP address change request to the server using the server's existing IP address, i.e. the first IP address. Applicants' method transitions from step 705 to step 710 wherein the server receives the IP address change request of step 705. Applicants' method transitions from step 710 to step 715 wherein the server requests a new IP address, i.e. a second IP address, from a DHCP server, such as DHCP server 530 (FIGS. 5A, 5B). Applicants' method transitions from step 715 to step 720 wherein the DHCP server provides a second IP address to the server.

In addition to transitioning from step 710 to step 715, Applicants' method also transitions from step 710 to step 730 wherein the server generates an HTML page comprising an embedded applet capable of monitoring the server's TCP/IP connection to the remote operator station. Further in step 730, the server provides that HTML page to the remote user.

Applicants' method transitions from step 730 to step 740 wherein the remote user receives the HTML page/applet of step 730. Applicants' method transitions from step 740 to step 745 wherein the remote user's input station begins to "ping" the server at a first time using the first IP address. In certain embodiments the "ping" of step 745 comprises a query to the server requesting that the server respond with a message that query was received. In certain embodiments, the "ping" of step 745 comprises a query having the format URL.openConnection( ).getInputStream( ).

In certain embodiments, Applicants' method transitions from step 745 to step 755 wherein Applicants' method determines if the server responded to the ping of step 745 within a first time interval after the first time of step 745. In certain embodiments, the first time interval is between about 10 milliseconds and about 10 seconds in duration. In certain embodiments, the first time interval is between about 1 second and about 3 seconds in duration. In certain embodiments, the first time interval is about 2 seconds in duration. In certain embodiments, the duration of the first time interval is determined by the user. In certain embodiments, the duration of the first time interval is embodied in software downloaded to the remote operator station from the server. In certain embodiments, the duration of the first time interval is determined by the server at runtime and included in the applet formed in step 730.

If Applicants' method determines in step 755 that the server responded to the ping of step 745 within the first time interval, then Applicants' method transitions from step 755 to step 745 wherein Applicants' method again pings the server using the first IP address. Applicants' method continues to ping the server using the first IP address as long as the server responds to the preceding ping within the first time interval, i.e. Applicants' method loops between steps 745 and 755 if the server continues to respond to the pings using the first IP address. As a general matter, if the server responds to the (n)th ping using the first IP address, the remote operator station then provides an (n+1)th ping using that first IP address.

During the iterative pinging/responding steps of steps 745 and 755, in step 750 the server provides the second IP address to the remote operator station, where that second IP address was generated by a DHCP server in response to the request of step 715. After that second IP address is received by the remote user using the remote operator station in step 750, Applicants' method loops between steps 745 and 755 bypassing step 750.

If Applicants' method determines in step 755 that the server did not respond to the (n)th ping of step 745 within the first time interval, then Applicants' method transitions from step 755 to step 760 wherein Applicants' method at a second time determines that the server has terminated TCP/IP services in order to change its IP address.

Applicants' method transitions from step 760 to step 765 wherein Applicants' method indicates to the user that the server is bringing up TCP/IP services using the second IP address. In certain embodiments, the remote operator station includes a visual display device. In certain of these visual display embodiments, Applicants' method in step 765 provides a visual message that the server is bringing up TCP/IP services using the second IP address. In certain embodiments, the remote operator station includes a printer. In certain of these printer embodiments, Applicants' method in step 765 provides a printed message that the server is bringing up TCP/IP services using the second IP address. In certain embodiments, the remote operator station includes a sound card. In certain of these sound card embodiments, Applicants' method in step 765 provides an auditory message that the server is bringing up TCP/IP services using the second IP address.

In certain embodiments, Applicants' method transitions from step 765 to step 770 wherein the applet provided in step 730 updates the contents of the HTML page of step 730 using Java to Javascript via LiveConnect mechanisms. In these embodiments, Applicants' method transitions from step 770 to step 785.

In certain embodiments, Applicants' method transitions from step 765 to step 775 wherein Applicants' method causes the remote operator station at a third time to provide the (n+1)th ping to the server using the second IP address. A second time interval comprises the difference between the second time of step 760 and the third time of step 775. In certain embodiments the duration of that second time interval is between about 1 second and about 30 seconds. In certain embodiments, duration of the second time interval is between 3 seconds and 5 seconds. In certain embodiments, the second time interval is about 4 seconds.

Applicants' method transitions from step 775 to step 780 wherein Applicants' method determines if the server responded to the ping of step 775 within a third time interval. In certain embodiments, the third time interval is between about 10 milliseconds and about 10 seconds in duration. In certain embodiments, the duration of the third time interval is between about 1 second and about 3 seconds. In certain embodiments, the third time interval is about 2 seconds in duration.

If Applicants' method determines in step 780 that the server did not respond to the ping of step 775 within the third time interval, then Applicants' method transitions from step 780 to step 775 wherein the remote operator station again pings the server using the second IP address.

Applicants' method continues to ping the server using the second IP address as long as the server does not respond to the preceding ping within the third time interval, i.e. Applicants' method loops between steps 775 and 780 if the server does not respond to the pings using the second IP address. As a general matter, if the server does not respond to the (n)th ping using the second IP address, the remote operator station then provides the (n+1)th ping using that second IP address.

Alternatively, if the server responds to the (n)th ping using the second IP address, then Applicants' method transitions from step 780 to step 785 wherein Applicants' method causes the remote operator station to rewrite the HTML page provided in step 730 to comprise an HTML redirect page. As those skilled in the art will appreciate, such an HTML redirect page comprises a metatag specifying a redirect time.

In certain embodiments, the redirect time is determined by the user. In certain embodiments, the redirect time is embodied in software downloaded to the remote operator station from the server. In certain embodiments, the redirect time is determined by the server at runtime and included in the applet formed in step 730. In certain embodiments which include steps 775 and 780, the redirect time is set to 0 seconds.

Applicants' method transitions from step 785 to step 790 wherein after the redirect time expires, Applicants' method causes the remote operator station to load a web page for accessing the server where that web page includes the second IP address. Applicants' method transitions from step 790 to step 795 wherein the server provides a message to the remoter server location that the IP address change is completed.

Applicants' invention includes an article of manufacture comprising a computer useable medium having computer readable program code or discrete logic disposed therein for implementing Applicants' method to change the IP address of a server using a remote operator station. Applicants' invention further includes a computer program product usable with a programmable computer processor having computer readable program code embodied therein for changing the IP address of a server using a remote operator station.

The embodiments of Applicants' method recited in FIGS. 4, 6, and/or 7, may be implemented separately. Moreover, in certain embodiments, individual steps recited in FIGS. 4, 6, and/or 7, may be combined, eliminated, or reordered.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to change the IP address of a server from a remote operator station comprising a display, wherein said server comprises an HTTP server having a first IP address, and wherein said server is capable of communicating with one or more remote operator stations, comprising the steps of:

submitting to said server from a first one of said one or more remote operator station using said first IP address an IP address change request, wherein said IP address change request comprises discontinuing use of said first IP address and commencing use of a second IP address;

generating a first HTML page comprising an embedded applet, wherein said applet is capable of monitoring the TCP/IP connection between said first remote operator station and said server;

providing said first HTML page to said first remote operator station;

displaying the status of said IP address change request;

providing the (n)th ping to said server using said first IP address;

determining if said server responds to said (n)th ping;

operative if said server responds to said (n)th ping, providing the (n+1)th ping to said server using said first IP address;

operative if said server does not respond to said (n)th ping providing the (n+1)th ping to said server using said second IP address;

determining if said server responds to said (n+1)th ping;

operative if said server does not respond to said (n+1)th ping, providing the (n+2)th ping to said server using said second IP address;

operative if said server responds to said (n+1)th ping, generating a second HTML page, wherein said second HTML page comprises a request to said second IP address.

2. A method to change the IP address of a server from a remote operator station comprising a display, wherein said server comprises an HTTP server having a first IP address, and wherein said server is capable of communicating with one or more remote operator stations, comprising the steps of:

submitting to said server from a first one of said one or more remote operator station using said first IP address an IP address change request, wherein said IP address change request comprises discontinuing use of said first IP address and commencement of use of a second IP address;

providing said second address to said server using said first remote operator input station;

generating by said server a first HTML page comprising an embedded applet, wherein said applet is capable of monitoring the TCP/IP connection between said remote operator station and said server;

providing said HTML page to said first remote operator station;

providing the (n)th ping to said server using said first IP address at a first time;

determining if said server responds to said (n)th ping;

operative if said server does not respond to said (n)th ping, providing the (n+1)th ping to said server using said second IP address;

determining if said server responds to said (n+1)th ping;

operative if said server responds to said (n+1)th ping, generating a second HTML page, wherein said second HTML page comprises a request to said second IP address;

displaying the status of said IP address change request.

3. An article of manufacture comprising a display and a computer readable medium having computer readable program code or discrete logic disposed therein to change the IP address of a server in communication with said article of manufacture, the computer readable program code comprising a series of computer readable program steps to effect:

submitting to said server using a first IP address an IP address change request, wherein said IP address change request comprises discontinuing use of said first IP address and commencing use of a second IP address;

receiving a first HTML page from said server comprising an embedded applet, wherein said applet is capable of monitoring the TCP/IP connection with said server;

displaying the status of said IP address change request providing the (n)th ping to said server using said first IP address;

determining if said server responds to said (n)th ping;

operative if said server responds to said (n)th ping, providing the (n+1)th ping to said server using said first IP address;

operative if said server does not respond to said (n)th ping;

providing the (n+1)th ping to said server using said second IP address;

determining if said server responds to said (n+1)th ping;

operative if said server responds to said (n+1)th ping, generating a second HTML page, wherein said second HTML page comprises a request to said second IP address.

4. An article of manufacture comprising a display and a computer useable medium having computer readable program code or discrete logic disposed therein to change the IP address of a server in communication with said article of manufacture, the computer readable program code comprising a series of computer readable program steps to effect:

submitting to said server using a first IP address an IP address change request, wherein said IP address change request comprises discontinuing use of said first IP address and commencing use of a second IP address;

providing said second address to said server;

receiving from said server a first HTML page comprising an embedded applet, wherein said applet is capable of monitoring the TCP/IP connection with said server;

providing the (n)th ping to said server using said first IP address;

determining if said server responds to said (n)th ping;

operative if said server does not respond to said (n)th ping, providing the (n+1)th ping to said server using said second IP address;

determining if said server responds to said (n+1)th ping;

operative if said server responds to said (n+1)th ping, generating a second HTML page, wherein said second HTML page comprises a request to said second IP address;

displaying the status of said IP address change request.

5. A computer program product usable with a programmable computer processor having computer readable program code or discrete logic embodied therein to change the IP address of a server from a remote operator station comprising a display, comprising:

computer readable program code which causes said programmable computer processor to submit to said server from said remote operator station using a first IP address an IP address change request, wherein said IP address change request comprises discontinuing use of said first IP address and commencement of use of a second IP address;

computer readable program code which causes said programmable computer processor to receive a first HTML page comprising an embedded applet, wherein said applet is capable of monitoring the TCP/IP connection between said remote operator station and said server;

computer readable program code which causes said programmable computer processor to display the status of said IP address change request;

computer readable program code which causes said programmable computer processor to provide the (n)th ping to said server using said first IP address;

computer readable program code which causes said programmable computer processor to determine if said server responds to said (n)th ping;

computer readable program code which, if said server responds to said (n)th ping, causes said programmable computer processor to provide the (n+1)th ping to said server using said first IP address;

computer readable program code which, if said server does not respond to said (n)th ping, causes said programmable computer processor to provide the (n+1)th ping to said server using said second IP address;

computer readable program code which causes said programmable computer processor to determine if said server responds to said (n+1)th ping;

computer readable program code which, if said server does not respond to said (n+1)th ping, causes said programmable computer processor to provide the (n+2)th ping to said server using said second IP address;

computer readable program code which, if said server responds to said (n+1)th ping, causes said programmable computer processor to generate a second HTML page, wherein said second HTML page comprises a request to said second IP address;

computer readable program code which causes said programmable computer processor to display the status of said IP address change request.

6. A computer program product usable with a programmable computer processor having computer readable program code or discrete logic embodied therein to change the IP address of a server from a remote location comprising a display, comprising:

computer readable program code which causes said programmable computer processor to submit to said server from said remote operator station using a first IP address an IP address change request, wherein said IP address change request comprises discontinuing use of said first IP address and commencing use of a second IP address;

computer readable program code which causes said programmable computer processor to provide said second address to said server;

computer readable program code which causes said programmable computer processor to receive from said server a first HTML page comprising an embedded applet, wherein said applet is capable of monitoring the TCP/IP connection with said server;

computer readable program code which causes said programmable computer processor to provide the (n)th ping to said server using said first IP address at a first time;

computer readable program code which causes said programmable computer processor to determine if said server responds to said (n)th ping;

computer readable program code which, if said server does not respond to said (n)th ping, causes said programmable computer processor to provide the (n+1)th ping to said server using said second IP address at a third time;

computer readable program code which causes said programmable computer processor to determine if said server responds to said (n+1)th ping;

computer readable program code which, if said server responds to said (n+1)th ping, causes said programmable computer processor to generate a second HTML page, wherein said second HTML page comprises a request to said second IP address;

computer readable program code which causes said programmable computer processor to display the status of said IP address change request.

* * * * *